United States Patent
Matsushima

(10) Patent No.: US 9,632,613 B2
(45) Date of Patent: Apr. 25, 2017

(54) DISPLAY CONTROL APPARATUS AND CONTROL METHOD OF DISPLAY CONTROL APPARATUS FOR REDUCING A NUMBER OF TOUCH TIMES IN A CASE WHERE A GUIDANCE IS NOT DISPLAYED AS COMPARED WITH A CASE WHERE THE GUIDANCE IS DISPLAYED

(71) Applicant: CANON KABUSHIKI KAISHA, Tokyo (JP)

(72) Inventor: Shuichiro Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 13/748,399

(22) Filed: Jan. 23, 2013

(65) Prior Publication Data

US 2013/0201128 A1 Aug. 8, 2013

(30) Foreign Application Priority Data

Feb. 2, 2012 (JP) ................................ 2012-021121

(51) Int. Cl.
G06F 3/041 (2006.01)
G06F 3/0482 (2013.01)
G06F 9/44 (2006.01)

(52) U.S. Cl.
CPC .......... G06F 3/0416 (2013.01); G06F 3/0482 (2013.01); *G06F 9/4446* (2013.01)

(58) Field of Classification Search
CPC ..... G06F 3/0416; G06F 3/0482; G06F 9/4446
USPC ....................................................... 345/173
See application file for complete search history.

(56) References Cited

U.S. PATENT DOCUMENTS

| | | | | |
|---|---|---|---|---|
| 8,013,922 B2* | 9/2011 | Isoyama | ................ | 348/333.02 |
| 8,365,098 B2* | 1/2013 | Won | ................ | G06F 3/0238 |
| | | | | 455/566 |
| 2003/0020731 A1* | 1/2003 | Kato | ................ | G06F 3/0481 |
| | | | | 345/619 |
| 2007/0124795 A1* | 5/2007 | McKissick et al. | ................ | 725/135 |
| 2009/0007020 A1* | 1/2009 | Suzuki et al. | ................ | 715/841 |
| 2009/0172597 A1* | 7/2009 | Mercer | ................ | 715/840 |
| 2009/0213485 A1* | 8/2009 | Matsushima et al. | ................ | 360/69 |
| 2011/0225539 A1* | 9/2011 | Lee et al. | ................ | 715/784 |
| 2012/0162242 A1* | 6/2012 | Amano | ................ | H04N 5/23293 |
| | | | | 345/592 |

(Continued)

FOREIGN PATENT DOCUMENTS

| | | |
|---|---|---|
| JP | 2008-065630 A | 3/2008 |
| JP | 2011-059820 A | 3/2011 |
| JP | 2011-238226 A | 11/2011 |

*Primary Examiner* — Kwang-Su Yang

(74) *Attorney, Agent, or Firm* — Canon U.S.A., Inc. IP Division

(57) ABSTRACT

When an item is selected with a touch from an item list, if display of a guidance is set to ON, the item is selected by a first touch and the guidance is displayed to view another item. A determination operation is performed by a second touch to the same item. If the display of the guidance is set to OFF, a determination operation of an touched item is performed by the first touch without displaying the guidance. Thus, when it is set that the guidance is not displayed, inconvenience that a user needs to touch the same option twice even the guidance display is not required to shift a screen to a sub-screen can be eliminated, and increase of troublesomeness for a shift operation to the sub-screen can be prevented.

19 Claims, 8 Drawing Sheets

(56) References Cited

U.S. PATENT DOCUMENTS

2012/0296726 A1\* 11/2012 Dessert et al. ............. 705/14.27

\* cited by examiner

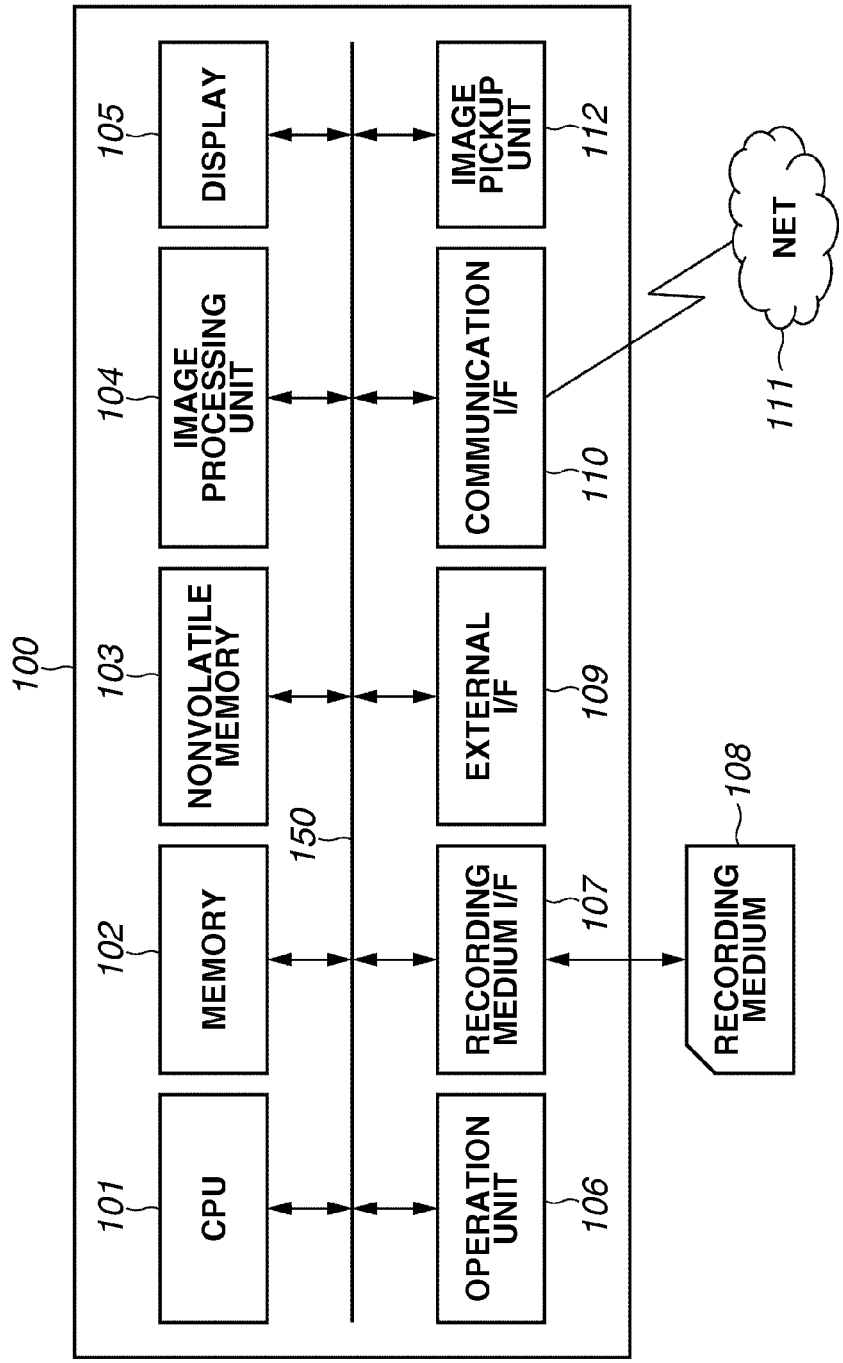

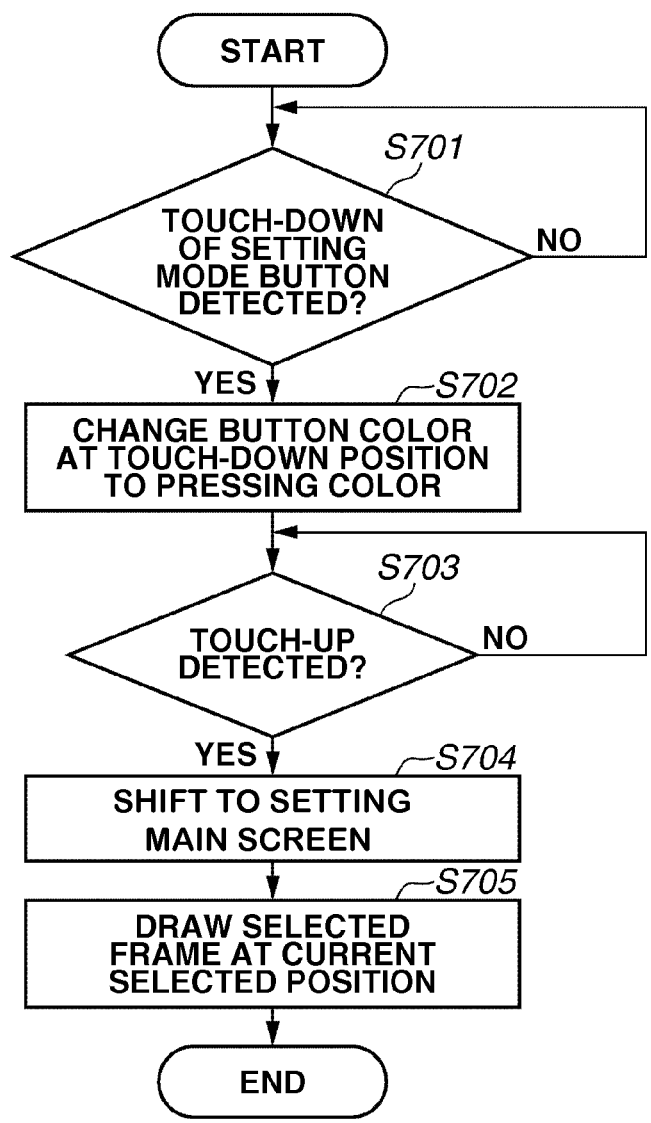

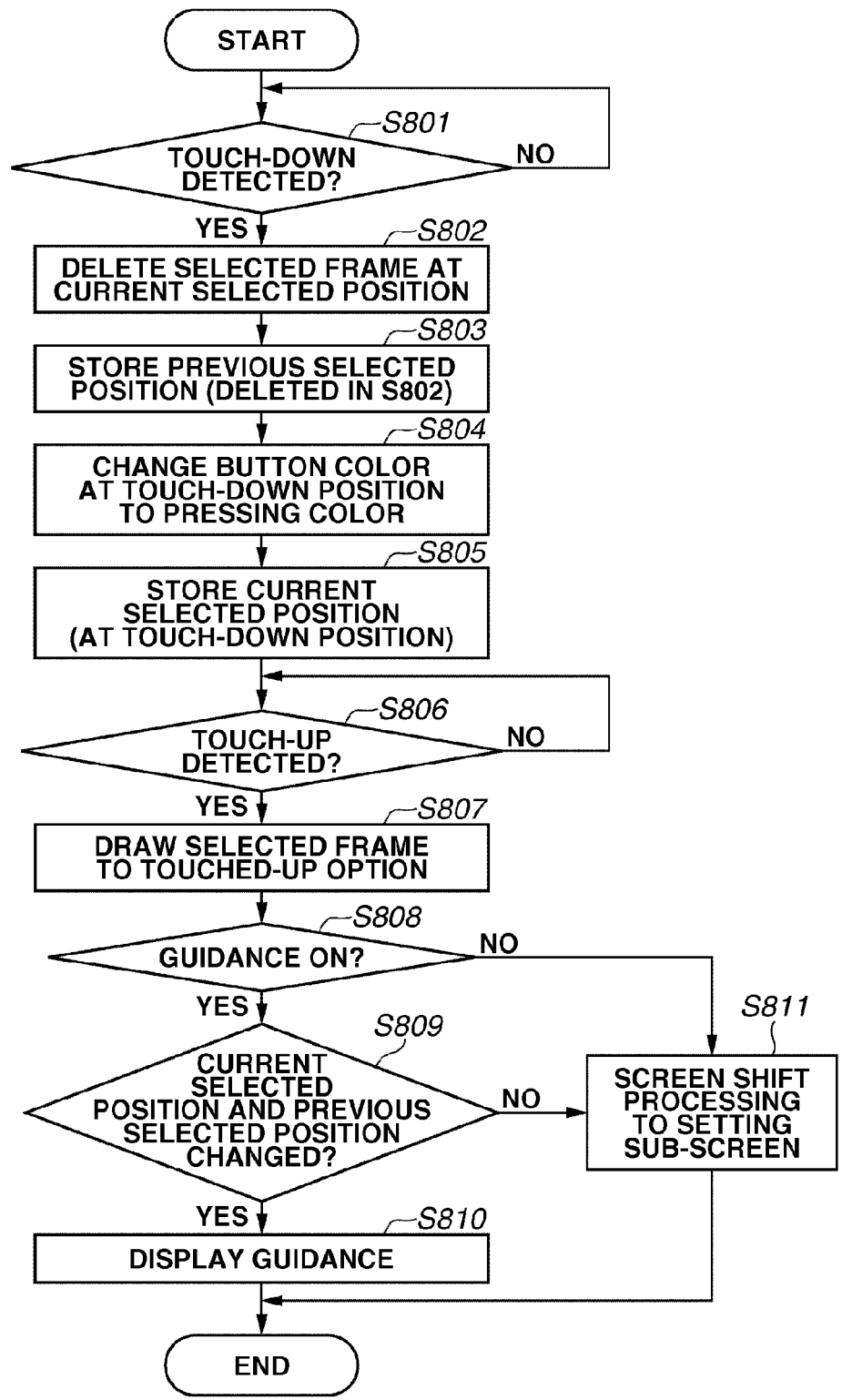

DISPLAY CONTROL APPARATUS AND CONTROL METHOD OF DISPLAY CONTROL APPARATUS FOR REDUCING A NUMBER OF TOUCH TIMES IN A CASE WHERE A GUIDANCE IS NOT DISPLAYED AS COMPARED WITH A CASE WHERE THE GUIDANCE IS DISPLAYED

BACKGROUND OF THE INVENTION

Field of the Invention

The present invention relates to a display control apparatus and a control method of the display control apparatus, in particular, to a technique suitable for being used for a touch panel for selecting an item from an item list with a touch.

Description of the Related Art

In recent years, an input device including a touch panel has been a mainstream trend, and a method is discussed to simplify an operation for determining an option (refer to Japanese Patent Application Laid-Open No. 2011-59820). In addition, there is an apparatus capable of displaying a guidance as an assisting function to a user. The guidance display apparatus may display information about an item of an option in a selected status, a constraint item, warning, and the like on a screen. Thus, even a user who is not used to operations can use the guidance display apparatus at ease.

When a display method for selecting an option and shifting a screen to a sub-screen is performed using a touch panel, it is required to realize an option selection operation for placing a cursor on an option to display a guidance and an option determination operation for shifting the screen to the sub-screen. To realize the two operations, there is a method for setting a selected status of an option with a first touch thereto to display the guidance, and performing a determination operation with a second touch to the option in the selected status to shift the screen to the sub-screen.

In an apparatus having a function for allowing a user to select whether to display the guidance, if it is set that the guidance is not displayed, although the guidance display is not required, the user needs to touch twice, i.e., selecting and determining the option, to determine the option. Therefore, there is an issue that it is more troublesome to execute the operation for shifting the screen to the sub-screen.

SUMMARY OF THE INVENTION

The present invention is directed to a technique for reducing the number of touch times in a case where a guidance is not displayed as compared with a case where the guidance is displayed.

According to an aspect of the present invention, a display control apparatus includes a display control unit configured to control a display unit to display a plurality of options, a touch operation reception unit configured to receive a touch operation performed to the display unit, a switching unit configured to switch ON-guidance for displaying a guidance of a selected option and OFF-guidance for not displaying a guidance, and a control unit configured to perform control, in a case where an option which is not selected is touched from the plurality of options in the ON-guidance, to set the touched option to a selected status, display a guidance of the option in the selected status while displaying at least one of other options, and, in response to a touch of the option in the selected status, perform a determination operation of the touched option, and, in a case of the OFF-guidance, to perform a determination operation of a touched option in response to a touch of the option regardless of whether the touched option is in a selected status or not.

According to the present invention, the number of touch times in the case where a guidance is not displayed can be reduced as compared with the case where the guidance is displayed. Thus, the determination operation without the guidance display can be simplified.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram of an example of a configuration for realizing a display control apparatus according to an exemplary embodiment of the present invention.

FIG. 7 is a flowchart illustrating a processing sequence for entering a function setting screen.

FIG. 8 is a flowchart illustrating option selection and determination processing.

DESCRIPTION OF THE EMBODIMENTS

Figure 2A:
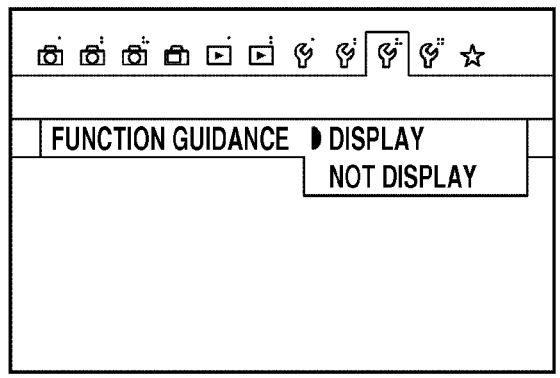
FIGS. 2A to 2C illustrate menu screens and guidance display screens.

Various exemplary embodiments, features, and aspects of the invention will be described in detail below with reference to the drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

FIG. 1 illustrates an example of a configuration of a display control apparatus 100 according to an exemplary embodiment of the present invention. According to the present exemplary embodiment, the display control apparatus 100 may include a personal computer (referred to as a PC).

Referring to FIG. 1, a central processing unit (CPU) 101, a memory 102, a nonvolatile memory 103, an image processing unit 104, a display 105, an operation unit 106, a recording medium interface (I/F) 107, an external interface (I/F) 109, and a communication interface (I/F) 110 are connected to an internal bus 150. Each of the units connected to the internal bus 150 can receive and transmit data from/to each other via the internal bus 150.

The memory 102 may include, e.g., a random access memory (RAM) (such as a volatile memory using a semiconductor device). The CPU 101 controls each unit in the display control apparatus 100 using the memory 102 as a work memory according to a program stored in the nonvolatile memory 103. The nonvolatile memory 103 stores image data, audio data, other data pieces, and various programs for operating the CPU 101. The nonvolatile memory 103 may include a hard disk (HD), a read only memory (ROM), and the like.

The image processing unit 104 performs various types of image processing on image data stored in the nonvolatile memory 103 or a recording medium 108, a video signal obtained via the external I/F 109, and image data obtained via the communication I/F 110 under the control of the CPU 101. The image processing performed by the image processing unit 104 includes analog-to-digital (A/D) conversion processing, digital-to-analog (D/A) conversion processing, and encoding processing, compression processing, decoding processing, enlargement/reduction processing (resize), noise reduction processing, and color conversion processing of the image data. The image processing unit 104 may include a dedicated circuit block for performing specific image processing. Alternatively, depending on a type of the image processing, the CPU 101 can perform the image processing according to the program without using the image processing unit 104.

The display 105 displays an image or a graphical user interface (GUI) screen forming a GUI based on the control of the CPU 101. The CPU 101 controls each unit in the display control apparatus 100 to generate a display control signal according to the program, to generate a video signal for being displayed on the display 105, and to output the generated signal on the display 105. The display 105 displays a video image based on the output video signal. The configuration of the display control apparatus 100 includes an interface for outputting a video signal to be displayed on the display 105 as well as the units, and the display 105 may be an external monitor (such as a television).

The operation unit 106 is an input device for receiving user operations including a character information input device such as a keyboard, a pointing device such as a mouse or a touch panel, a button, a dial, a joy stick, a touch sensor, or a touch pad. The touch panel is an input device that is planarly structured to be overlapped to the display 105 and outputs coordinate information corresponding to a touch position. According to the present exemplary embodiment, the touch panel is used as the operation unit 106, and touch operation reception processing is performed to select an item from an item list with touch.

The recording medium 108 such as a memory card, a compact disc (CD), or a digital versatile disc (DVD) is attachable to the recording medium I/F 107. The recording medium I/F 107 reads data from the attached recording medium 108 and writes data to the recording medium 108 based on the control of the CPU 101. The external I/F 109 is an interface that is connected to an external device by a wired cable or a wireless manner, and inputs and outputs a video signal and an audio signal. The communication I/F 110 receives and transmits various data pieces such as a file and a command by communication with an external device or an Internet 111.

If the operation unit 106 includes the touch panel, the CPU 101 can detect the following operations to the touch panel. That is, operations include an operation for touching the touch panel with a finger or a pen (hereinbelow, referred to as touch-down), an operation for keeping the finger or the pen touching the touch panel (hereinbelow, referred to as touch-on), an operation for moving the finger or the pen while keeping the finger or the pen touching the touch panel (hereinbelow, referred to as move), an operation for releasing the finger or the pen from the touch panel (hereinbelow, referred to as touch-up), and a state that nothing touches the touch panel (hereinbelow, referred to as touch-off).

These operations and positional coordinates on which the finger or the pen touches the touch panel are notified to the CPU 101 via the internal bus 150. The CPU 101 determines based on the notified information, which operation is performed on the touch panel. Regarding the move, a moving direction of the finger or the pen moving on the touch panel can be determined with respect to each vertical component and horizontal component on the touch panel based on a change in positional coordinates.

A series of operations from the touch-down to the touch-up via a predetermined move on the touch panel is regarded as drawing of a stroke. An operation for quickly drawing a stroke is referred to as a flick. A flick is an operation such that the finger is quickly moved at a certain distance while touching the touch panel, and then released therefrom. In other words, the flick is an operation such as to quickly trace the touch panel like snapping a surface of the touch panel with the finger. If the move at a predetermined distance or more at a predetermined speed or more is detected and further the touch-up is detected, it is determined that the flick is performed.

If the move at the predetermined distance or more at a speed less than the predetermined speed, it is determined that drag is performed. For the touch panel, various types of the touch panel may be adopted such as a resistive film type, a capacitance type, a surface acoustic wave type, an infrared type, an electromagnetic induction type, an image recognition type, and an optical sensor type.

As described above, the nonvolatile memory 103 stores a program for controlling the CPU 101. For example, the nonvolatile memory 103 includes a display control unit for displaying a guidance, a guidance display switching unit for switching whether to display the guidance, and a status switching unit for switching a setting display status and a setting status.

The guidance display control unit controls an operation for displaying a character string corresponding to an option in the selected status, e.g., a description of contents of the option, an operation method thereof, or a warning of the option.

FIG. 2A illustrates a menu screen including the guidance display switching unit. To enable or disable the guidance function can be switched by selecting one of setting items "display" and "not display" from a "function guidance" on the menu screen. Then, a status in which the guidance display is performed is referred to as "ON-guidance", and a status in which the guidance display is not performed is referred to as "OFF-guidance".

The setting display status means a setting status display screen, and the setting status means a setting main screen. The above-described display control unit includes a unit for switching the setting status display screen and the setting main screen.

Figure 2B:
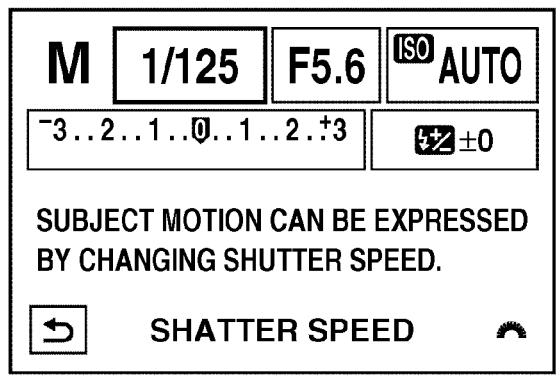
Figure 2C:
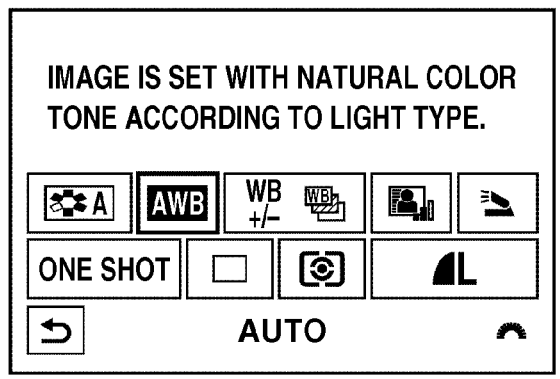

FIGS. 2B and 2C illustrate examples of the guidance display on the setting status display screen. Those are examples which are displayed by a display control apparatus used for an image pickup apparatus having an image pickup unit. The image pickup unit includes a shutter control unit, a diaphragm control unit, and an international organization for standardization (ISO) sensitivity control unit. If a shutter value as an option is in a selected status, the guidance is displayed to a first region as a lower half region in which the shutter value of the option is not hidden. If automatic white balance (AWB) as an option is in the selected status, the guidance is displayed to a second region as an upper half region so that the AWB as the option is not hidden.

The shutter value, a diaphragm value, and an ISO sensitivity value as setting items for camera control are setting values relating to each other, and are frequently changed at a shooting time. Therefore, it is desirable that these values can be simultaneously viewed at the setting time. Further, the exposure and the brightness of a shot image are determined by the combination of these setting values, and their correlation needs to be grasped. Therefore, the setting values are arranged as the options in the upper half region. Referring to FIG. 2B, if any one of the shutter value, the diaphragm value, and the ISO sensitivity value is in the selected status, the selected value can be displayed without being hidden by the guidance.

Operations of the ON-guidance and the OFF-guidance as features of the present invention are described below with screen examples.

Figure 3A:
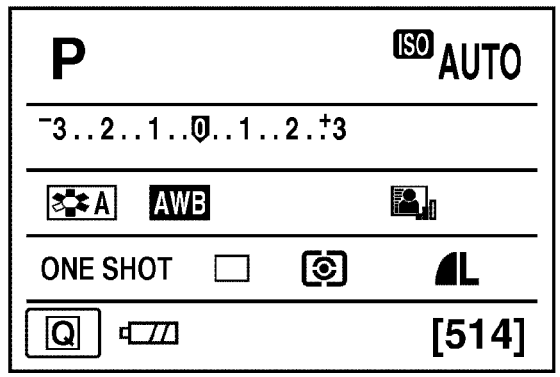
FIGS. 3A to 3C illustrate examples of screens indicating a sequence for entering a function setting main screen.
Figure 3B:
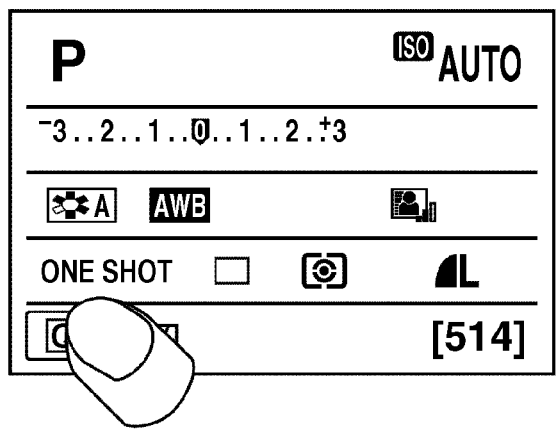
Figure 3C:
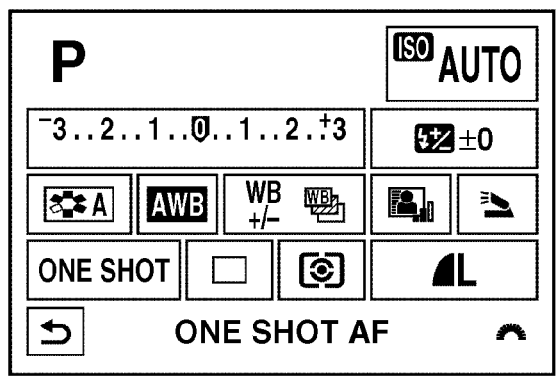

FIGS. 3A to 3C are examples of screens illustrating a sequence for entering the setting main screen for setting the function from the setting status display screen for displaying the setting statuses of the respective functions. Referring to FIG. 3A, the setting statuses of the respective functions are displayed as a list on the screen. When a setting button at the lower left is pressed as illustrated in FIG. 3B, the status enters the setting main screen in FIG. 3C.

On the setting main screen, each item is displayed with a button. The cursor is touched to a button frame of the item in the selected status, and the selected status is displayed. The cursor position just after entering the setting main screen indicates the item of which setting is changed in the previous time. The previously set item is stored as the previously selected position to the nonvolatile memory 103. At the first display after starting the system, the cursor is touched to an initial setting item. Only just after entering the setting main screen, the guidance is not displayed irrespectively of the ON-guidance and the OFF-guidance to ensure the property of list view of options.

Figure 4A:
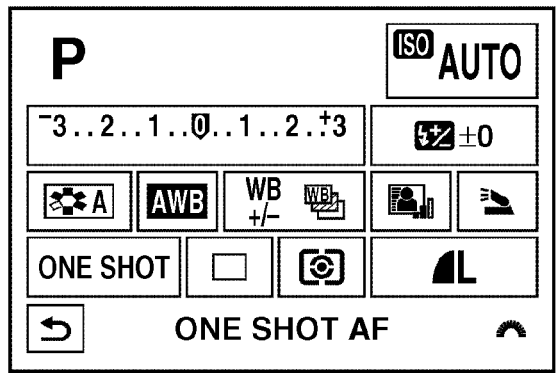
FIGS. 4A to 4C illustrate examples of screens for describing an option selection operation in ON-guidance.
Figure 4B:
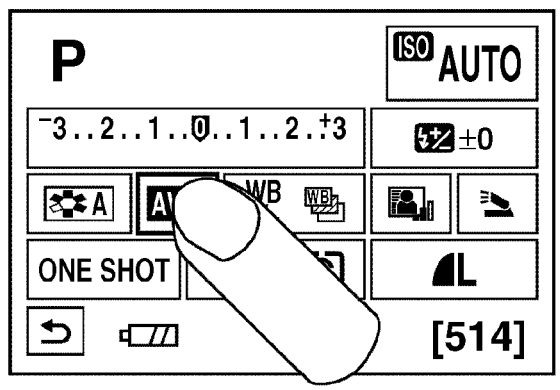
Figure 4C:
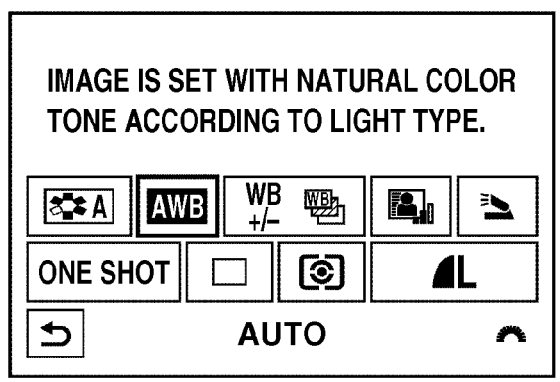

FIGS. 4A to 4C are examples of screens illustrating a sequence for selecting an option in the ON-guidance. An icon displayed in the button of the item indicates the current setting status, and the setting status can be changed on the setting sub-screen. An operation to select the auto white balance (AWB) is described.

Referring to FIG. 4A, the cursor is touched to an option "ONE SHOT" for determining an auto-focus (AF) operation in the initial status on the setting main screen. When the AWB button is touched down in this status as illustrated in FIG. 4B, the cursor is moved to the AWB, and the guidance for describing contents of the AWB is simultaneously displayed as illustrated in FIG. 4C.

Figure 5A:
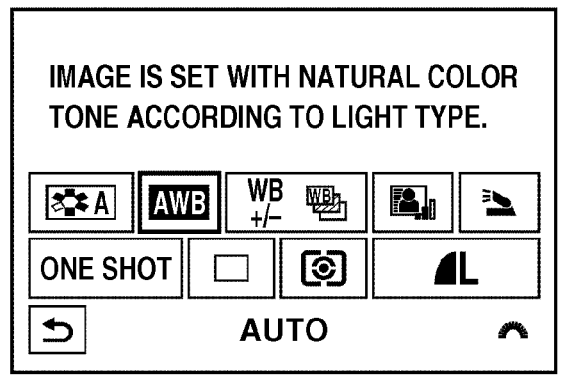
FIGS. 5A to 5C illustrate examples of screens for describing an option determination operation in the ON-guidance.
Figure 5B:
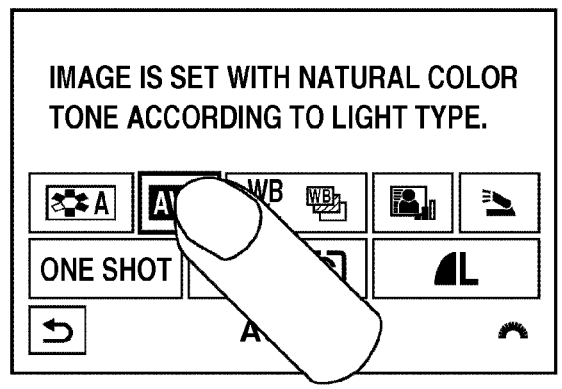
Figure 5C:
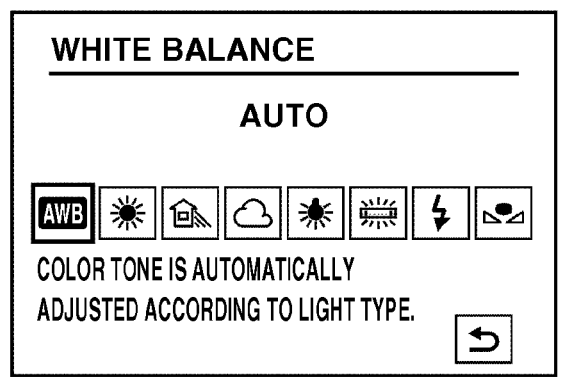

FIGS. 5A to 5C are examples of screens illustrating a sequence for determining the option and shifting the screen to the setting sub-screen. After performing the operations as in FIGS. 4A to 4C or after setting the AWB to the selected status with the previous final operation and performing the operations as in FIGS. 3A to 3C, the AWB is in the selected status in FIG. 5A. When the AWB in the selected status is touched as illustrated in FIG. 5B, the screen shifts to the sub-screen for setting the AWB as illustrated in FIG. 5C.

Figure 6A:
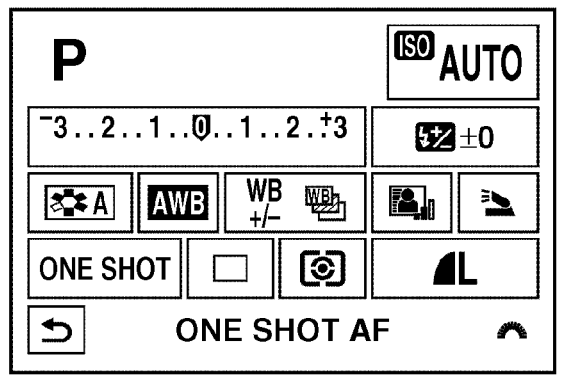
FIGS. 6A to 6C illustrate examples of screens for describing an option selection operation in OFF-guidance.
Figure 6B:
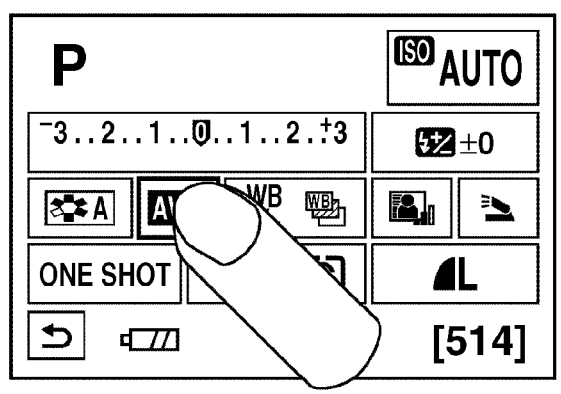
Figure 6C:
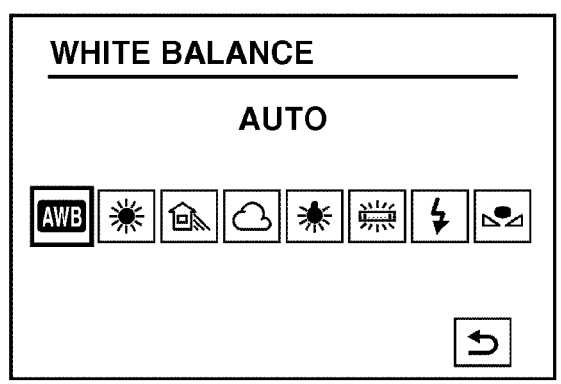

FIGS. 6A to 6C are examples of screens illustrating a sequence for determining an option in the OFF-guidance. On the setting main screen (in FIG. 6A), the AWB button is touched (in FIG. 6B), and the screen then shifts to the setting sub-screen (in FIG. 6C). In the OFF-guidance, regardless of the cursor position before the touch, the option is determined with a touch. Therefore, the number of touch times can be reduced by one as compared with that in the ON-guidance.

Regarding the selection and determination processing of the option, a flow of operation control processing executed by the CPU 101 is described.

FIG. 7 is a flowchart illustrating of a processing flow of the CPU 101 when the setting status display screen shifts to the setting main screen. The operation control processing is realized by loading the program recorded to the nonvolatile memory 103 to the memory 102 that functions as a work memory and executing the program by the CPU 101.

In step S701, the touch-down of a setting mode button is detected. On the setting status display screen that displays the setting status of the camera (in FIG. 3A), if the touch-down of the setting button at the lower left on the screen is detected (YES in step S701), then in step S702, the button color is changed to a color indicating that the button color is in a pressed status (in FIG. 3B).

In step S703, the touch-up of the button is detected. If the touch-up is detected (YES in step S703), then in step S704, the screen shifts to the setting main screen.

In step S705, a selection frame is drawn to an option at the previously selected position in the selected status (in. FIG. 3C). The previously selected position is a cursor position stored in step S803 (in FIG. 8), and the details are described below.

FIG. 8 is a flowchart illustrating of a processing flow of the CPU 101 for selecting and determining the option and shifting the screen to the setting sub-screen.

In step S801, the touch-down of the button is detected on the setting main screen (in FIG. 4A). If the touch-down of the button is detected (YES in step S801), then in step S802, the selection frame at the currently selected position is deleted. In step S803, the currently selected position is set as the previously selected position, and is stored to the memory 102.

In step S804, the button color at the touch-down is changed to a pressing color. In step S805, the touch-down position is set as the currently selected position, and is stored to the memory 102.

In step S806, the touch-up is detected. If the touch-up is detected (YES in step S806), then in step S807, the pressing color of the button at the currently selected position is deleted and the selection frame is drawn.

In step S808, it is determined whether the status is in the ON-guidance or the OFF-guidance. If the status is in the OFF-guidance (NO in step S808), in step S811, the screen shifts to the setting sub-screen. If the status is in the ON-guidance (YES in step S808), then in step S809, the currently selected position is compared with the previously selected position. If the selected position is changed as the comparison result (YES in step S809), then in step S810, the guidance for the currently selected position is displayed. Then, the processing ends.

If the selected position is not changed as the comparison result (NO in step S809), in other words, the already selected button is touched at the second time. Then in step S811, screen shifting processing is performed to shift the screen to the setting sub-screen.

According to the above-described processing in the present exemplary embodiment, if it is determined as the OFF-guidance status in step S808, the screen shifts to the setting sub-screen regardless of the previously selected position. Thus, the number of operation steps can be reduced.

The control described referring to FIGS. 7 and 8 may be performed by one unit of hardware. Alternatively, a plurality of units of hardware may share the processing, and the entire apparatus thus may be controlled. The exemplary embodiment of the present invention is described as above. However, the present invention is not limited to the specific exemplary embodiment, and the exemplary embodiment can be variously modified without departing the essentials of the present invention.

According to the above-described exemplary embodiment, the present invention is applied to the display control apparatus. However, the present invention is not limited to the display control apparatus, and can be applied to any apparatus using a touch panel for selecting an item from an item list. More specifically, the present invention can be applied to a personal computer, a personal data assistance (PDA), a mobile phone terminal, a mobile image viewer, a printer apparatus including a display device, a digital photo frame, a music player, a game machine, an electronic book reader, and so on.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-021121 filed Feb. 2, 2012, which is hereby incorporated by reference herein in its entirety.

What is claimed is:

1. A display control apparatus comprising:
a display control unit configured to control a display unit to display a plurality of options on a selection screen;
a touch operation reception unit configured to receive a touch operation performed to the display unit;
a switching unit configured to switch between ON-guidance for displaying a guidance of a selected option and OFF-guidance for not displaying a guidance by receiving a selection for one of setting status to display the guidance and not to display the guidance; and
a control unit configured to perform control, in a case of the ON-guidance, in response to a first touch of an unselected option from the plurality of options displayed on the selection screen, to display, on the selection screen, a touched option in a selected status and a guidance of the touched option in the selected status, without performing a determination operation, and in response to a second touch of the first touched option in the selected status that is performed after the first touch, to perform a determination operation of the touched option, and, in a case of the OFF-guidance, in response to a first touch of the unselected option from the plurality of options, to perform a determination operation of the first touched option.

2. The display control apparatus according to claim 1, wherein the determination operation of the touched option is an operation for deleting all displayed options and opening a setting sub-screen of the option.

3. The display control apparatus according to claim 1, wherein, in a case where an option displayed in a first region of a screen is touched, the guidance is displayed in a second region, and in a case where an option displayed in the second region is touched, the guidance is displayed in the first region.

4. The display control apparatus according to claim 3, wherein the first region is a lower half of a screen, and the second region is an upper half of a screen.

5. The display control apparatus according to claim 1, further comprising:
a status switching unit configured to switch a setting display status for displaying a setting status of an option and a setting status for selecting and determining an option,
wherein the guidance display control unit does not display a guidance regardless of whether a status is in the ON-guidance or the OFF-guidance only in a case where the status switching unit switches the setting display status to the setting status.

6. The display control apparatus according to claim 5, wherein in the case where the status switching unit switches the setting display status to the setting status, the control unit sets an option finally set in a selected status in the setting status to the selected status.

7. The display control apparatus according to claim 1, wherein, if a first option is selected from the plurality of options and a guidance of the first option is displayed, a second option is simultaneously displayed without being overlapped to the guidance, and
wherein if the second option is selected from the plurality of options and a guidance of the second option is displayed, the first option is simultaneously displayed without being overlapped to the guidance.

8. The display control apparatus according to claim 1, further comprising:
an image pickup unit,
wherein the display unit displays, as the plurality of options, a shutter value, a diaphragm value, and an ISO sensitivity value as setting values for image pickup by the image pickup unit, and
wherein, in a case where any one of the shutter value, the diaphragm value, and the ISO sensitivity value is in a selected status and a guidance is displayed, the shutter value, the diaphragm value, and the ISO sensitivity value are simultaneously displayed without being overlapped to the guidance.

9. A non-transitory computer readable storage medium storing a program for causing a computer to function as units in a display control apparatus according to claim 1.

10. The display control apparatus according to claim 1, wherein the guidance is a guidance to be displayed with being superimposed on an option not in a selected status among the plurality of options, on a setting screen on which the plurality of options is displayed.

11. The display control apparatus according to claim 1, wherein in a case of the ON-guidance, and in a case where there is an option in a selected status among the plurality of options, in response to a touch of an option not in a selected status among the plurality of options, an option displayed in a selected status is switched.

12. The display control apparatus according to claim 1, wherein the control unit is configured to perform control to display the guidance without displaying a setting sub-screen related to a selected option.

13. The display control apparatus according to claim 1, wherein a same screen is displayed in response to a determination operation of a same option in both cases of the ON-guidance and the OFF-guidance.

14. A display control apparatus comprising:
a display control unit configured to control a display unit to display a plurality of options on a selection screen;
a touch operation reception unit configured to receive a touch operation performed to the display unit;
a switching unit configured to switch between ON-guidance for displaying a guidance of a selected option and OFF-guidance for not displaying a guidance of a selected option by receiving a selection for one of setting status to display the guidance and not to display the guidance; and
a control unit configured to perform control, in a case of the OFF-guidance, in response to a first operation for an option from the plurality of options, to perform a determination operation of the first operation, and, in a case of the ON-guidance, in response to a first operation for the option from the plurality of options displayed on the selection screen, to display, on the selection screen, the option on which the first operation has been performed in a selected status as a selected option and a guidance of the option on which the first operation has been performed in the selected status, without performing the determination operation, and in response to a second operation for the option on which the first operation has been performed in the selected status that is performed after the first operation, to perform the determination operation, the first operation and the second operation being touch operations.

15. The display control apparatus according to claim 14, wherein the first operation and the second operation are release of the touch.

16. The display control apparatus according to claim 14, wherein the determination operation is screen shifting processing.

17. A non-transitory computer readable storage medium storing a program for causing a computer to function as units in a display control apparatus according to claim 14.

18. A method for controlling a display control apparatus, the method comprising:
controlling a display unit to display a plurality of options on a selection screen;
receiving a touch operation performed to the display unit;
switching between ON-guidance for displaying a guidance of a selected option and OFF-guidance for not displaying a guidance by receiving a selection for one of setting status to display the guidance and not to display the guidance;
performing control, in a case of the ON-guidance, in response to a first touch of an unselected option from the plurality of options displayed on the selection screen, to display, on the selection screen, a touched option in a selected status and a guidance of the touched option in the selected status, without performing a determination operation, and in response to a second touch of the first touched option in the selected status that is performed after the first touch, to perform a determination operation of the touched option; and,
performing control, in a case of the OFF-guidance, in response to a first touch of the unselected option from the plurality of options to perform a determination operation of the first touched option.

19. A method for controlling a display control apparatus, the method comprising:
controlling a display unit to display a plurality of options on a selection screen;
receiving a touch operation performed to the display unit;
switching between ON-guidance for displaying a guidance of a selected option and OFF-guidance for not displaying a guidance of a selected option by receiving a selection for one of setting status to display the guidance and not to display the guidance; and
performing control, in a case of the OFF-guidance, in response to a first operation for an option from the plurality of options, to perform a determination operation of the first operation, and, in a case of the ON-guidance, in response to a first operation for the option from the plurality of options displayed on the selection screen, to display, on the selection screen, the option on which the first operation has been performed in a selected status as a selected option and a guidance of the option on which the first operation has been performed in the selected status, without performing the determination operation, and in response to a second operation for the option on which the first operation has been performed in the selected status that is performed after the first operation, to perform the determination operation, the first operation and the second operation being touch operations.

* * * * *